Patented Jan. 2, 1923.

1,440,961

UNITED STATES PATENT OFFICE.

SIDNEY M. CADWELL, OF NEW YORK, N. Y., ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing. Application filed February 19, 1920, Serial No. 359,808. Renewed January 21, 1922. Serial No. 531,007.

*To all whom it may concern:*

Be it known that I, SIDNEY M. CADWELL, a citizen of the United States, residing in New York, county of New York, and State of New York, have invented certain new and useful Improvements in Processes for Vulcanizing Rubber and Products Obtained Thereby, of which the following is a full, clear, and exact description.

This invention relates to vulcanizing rubber and to the products obtained thereby. It more particularly relates to the acceleration of vulcanization by a class of organic accelerators and the products derived therefrom.

Various organic accelerators have been heretofore proposed both of the aromatic and aliphatic series of carbon compounds. The more promising of the organic accelerators up to the present has been the class of aliphatic amines and their derivatives especially the derivatives formed by the addition of these products to carbondisulphide. These materials serve to produce vulcanization in a satisfactorily short time and provide physical properties in the rubber which are also acceptable. With one exception, however, no one of them has been published as an accelerator for vulcanization at ordinary temperatures. That exception is piperidinepiperidyldithiocarbamate set forth by Ostromislensky. A particular disadvantage of this nitrogen-containing type of accelerator also resides in the fact that its parent substances, for example, the aliphatic amines etc. are difficultly obtainable and are consequently expensive.

The present invention seeks as an object accordingly to provide a vulcanizing process employing an accelerator which while possessing the advantages of the amine accelerators shall do away with the disadvantages thereof, that is, to provide a class of accelerators whose raw material shall be easily procurable, which may be obtained by simple processes of manufacture and which shall therefore represent relatively inexpensive finished products. Another object is to provide a class of accelerator compounds which by the variation of one or more of the components of the compound or of substances used therein shall permit variation of the time or temperature or both time and temperature of vulcanization. Another object of the invention is to provide a series of products produced by a process of vulcanization including accelerators of the kind mentioned above which shall possess desirable physical characteristics such as high tensile strength, resistance to flexing, etc.

The invention accordingly consists broadly in a process and product obtained therefrom for treating rubber which comprises subjecting the rubber to a vulcanizing agent and a metallic xanthogenate.

The preferred member of this group of accelerators with which I have secured excellent results is zinc ethylxanthogenate.

In carrying out the process in its preferred form the following mixture is made:

100 parts of rubber,
10 parts of zinc oxide,
1 part of sulphur,
4 parts of zinc ethylxanthogenate.

The material is placed in a mold and subjected to 40 lbs. per square inch steam pressure for thirty minutes when vulcanization is completed. If the material be allowed to remain in the mold two or three times as long, no further vulcanization is secured than is secured in thirty minutes. If the compound is mixed with an inorganic accelerator such as litharge, superior results in point of time and temperature may be obtained.

Still more effective vulcanization may be accomplished by the use of materials of this class with aliphatic or aromatic amines or their derivatives in suitable proportions, specifically the following mixture:

100 parts of rubber,
3 parts of sulphur,
1 part of formine,
5 parts of zinc ethylxanthogenate, at 40 lbs. steam pressure cures to provide a transparent stock in approximately ten minutes. If the formine mentioned above be replaced by 5 parts of aniline, a transparent cure may be obtained at temperatures below 212° F. It will thus be obvious that the result here obtained by the admixture of aniline with an accelerator of the type described secures a result which differs from the sum of the results of the two accelerators when used alone. In other words aniline requires a long period, approximately two hours, to effect with sulphur a cure. Accelerators of the type mentioned herein normally cure at ordinary vulcanizing temperatures, but as above stated when combined these accelerators produce a vulcanization at temperatures below the ordinary vulcanizing temperatures, frequently at or about room temperature.

Zinc ethylxanthogenate may be prepared by treating the water solution of a soluble xanthogenate such as potassium ethylxanthogenate with a soluble zinc salt such as zinc sulphate. The insoluble zinc ethylxanthogenate comes down as a creamy yellow precipitate which turns white upon air drying. The compound is a fine white powder. Potassium ethylxanthogenate may be prepared as follows: To one part of KOH (potassium hydroxide) in one-half part of water, add with stirring and cooling, one part of carbon bisulphide in one part of alcohol. The reaction gives off much heat and care must be exercised to prevent loss of carbon bisulphide. The mass becomes solid and orange in color at the end of the reaction. Cool and filter off the potassium ethylxanthogenate which can be recrystalized from water or alcohol in both of which it is very soluble and comes out in fibrous bundles. The yield is almost quantitive.

Zinc ethylxanthogenate is a representative of a large class of similar substances which provide similar results.

Included in this group are the following materials:—

Barium ethylxanthogenate
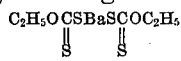

Sodium methylxanthogenate
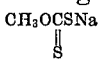

Lead methylxanthogenate
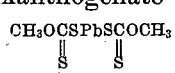

Zinc methylxanthogenate
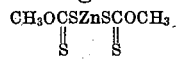

Lithium ethylxanthogenate
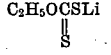

Magnesium ethylxanthogenate
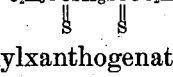

Calcium ethylxanthogenate
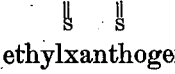

Ammonium ethylxanthogenate
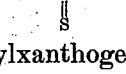

Potassium ethylxanthogenate

Sodium ethylxanthogenate
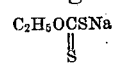

Ferric ethylxanthogenate
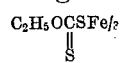

Lead ethylxanthogenate
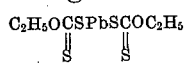

Mercuric ethylxanthogenate
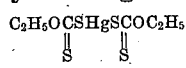

Potassium amylxanthogenate
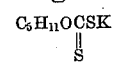

Zinc amylxanthogenate
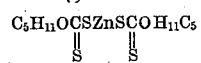

It will be obvious that other metals and radicals may be employed in making similar and equivalent compounds for use as accelerators, and such variations will produce slightly different results in the vulcanization process according to the nature of the substituted metal or radical. For example, the potassium ethylxanthogenate may be employed as an accelerating agent to cure at ordinary temperatures, say 70° F. Zinc ethylxanthogenate cures at higher temperatures however, when used alone, but as pointed out when employed with various amine accelerators, vulcanizes at temperatures as low as 70° F. In place of sulphur in the above compounds various members of the sulphur group may be substituted as equivalents, such as selenium, tellurium and oxygen.

Various types of accelerators may be used to replace formine in the formula given above, for example, the aliphatic and aromatic amines may be so employed and various derivatives and homologues thereof. The vulcanized products resulting from the process employed as above set forth in general possess the desirable physical characteristics and other properties obtainable by vulcanization with the better amine accelerators. In addition as set forth above, particularly with aniline and formine, transparent stocks are produced. Certain of the materials of this class provide unpleasant odors in the cured stock and are not so desirable on account of this characteristic. Many others however are free from this objectionable feature and possess the various desirable characteristics which combine to provide an efficient accelerator. In some instances the objectionable odor is overcome by the use of the various amines, for example, zinc ethylxanthogenate sometimes provides a stock which has a disagreeable odor but if used with aniline this odor substantially disappears.

It will be understood that although vulcanization in a mold has been set forth herein, other types of vulcanization such as in open steam and air may be employed. In some instances, hot water at or about 212° F. or lower may be employed. In air-vulcanization at ordinary vulcanizing temperatures, in certain accelerators of this type, the cure may be effected rapidly without the use of zinc oxide, so that a transparent stock is obtainable.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for treating rubber, which comprises subjecting the rubber to a vulcanizing agent and zinc ethylxanthogenate, and vulcanizing the rubber.

2. A process for treating rubber, which comprises subjecting the rubber to a vulcanizing agent and a substance comprising a zinc salt of the addition product of carbondisulphide, potassium hydroxide and ethyl alcohol, and vulcanizing the rubber.

3. A process for treating rubber, which comprises subjecting the rubber to a vulcanizing agent, zinc ethylxanthogenate and an amine accelerator, and vulcanizing the rubber.

4. A process for treating rubber, which comprises subjecting the rubber to a vulcanizing agent, a zinc salt of the addition product of carbondisulphide, potassium hydroxide, ethyl alcohol, and aniline, and vulcanizing the rubber.

5. The process of treating rubber or similar material, comprising combining it with a vulcanizing agent, zinc ethylxanthogenate, and aniline, and vulcanizing the rubber at a low temperature.

6. A vulcanized rubber derived from rubber combined with zinc ethylxanthogenate.

7. A vulcanized rubber derived from rubber combined with the zinc salt of the addition product of carbondisulphide, potassium hydroxide and ethyl alcohol.

8. A vulcanized rubber derived from rubber combined with zinc ethylxanthogenate, and an amine accelerator.

9. A vulcanized rubber derived from rubber combined with the zinc salt of the addition product of carbondisulphide, potassium hydroxide and ethyl alcohol, and aniline.

10. The process of accelerating the vulcanization of a composition containing rubber or the like and an agent of vulcanization, which comprises vulcanizing the composition together with a vulcanization accelerator which is a carbon bisulfide addition product of ethyl alcohol.

11. The process of accelerating the vulcanization of a rubber composition which comprises vulcanizing the composition together with a metallic salt of ethyl xanthogenate as a vulcanization accelerator.

12. The process of accelerating the vulcanization of a composition containing a plastic gum which comprises vulcanizing the composition together with zinc ethyl xanthogenate and lead ethyl xanthogenate.

13. The process of manufacturing a low-temperature vulcanizing composition which comprises milling together a vulcanizable gum, sulphur, and zinc ethyl xanthogenate.

14. The process of accelerating the vulcanization of a composition containing rubber or the like and an agent of vulcanization, which comprises vulcanizing the composition together with a vulcanization accelerator which is a carbon bisulfide addition product of methyl alcohol.

15. The process of accelerating the vulcanization of a composition containing a plastic gum and a vulcanizing agent, which comprises vulcanizing the composition together with a metallic salt of methyl xanthogenate.

16. The process of accelerating the vulcanization of a plastic gum which comprises vulcanizing the composition together with zinc methyl xanthogenate.

Signed at New York, county and State of New York, this 3rd day of February, 1920.

SIDNEY M. CADWELL.